Figure 5:
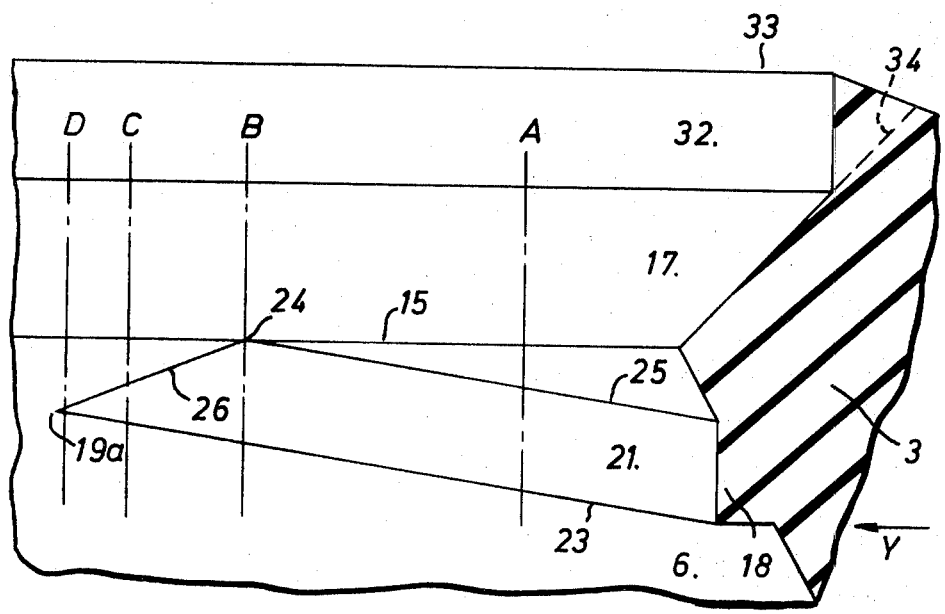
Figure 5A:
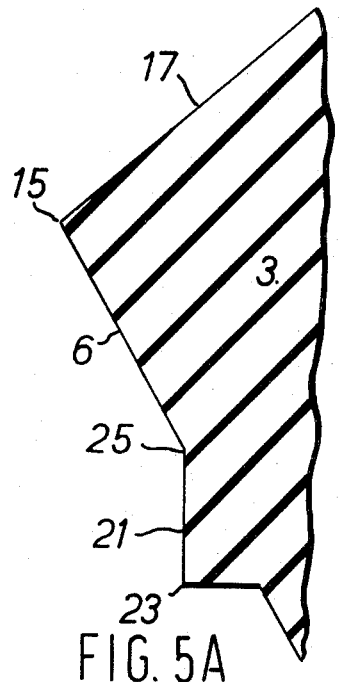
Figure 5B:
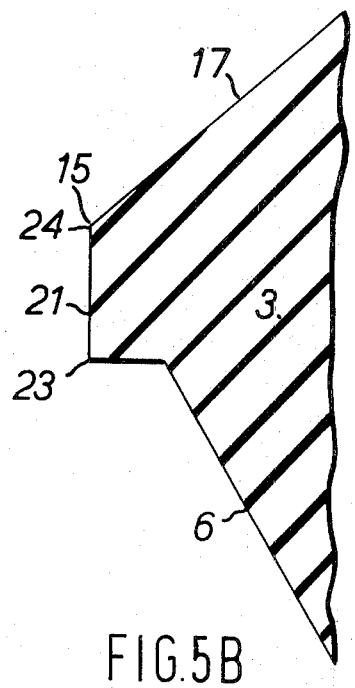
Figure 5C:
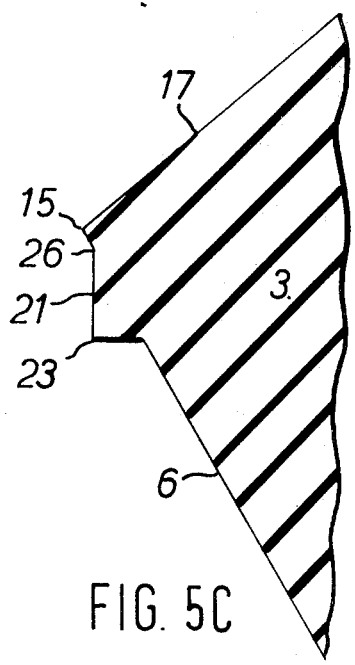
Figure 5D:
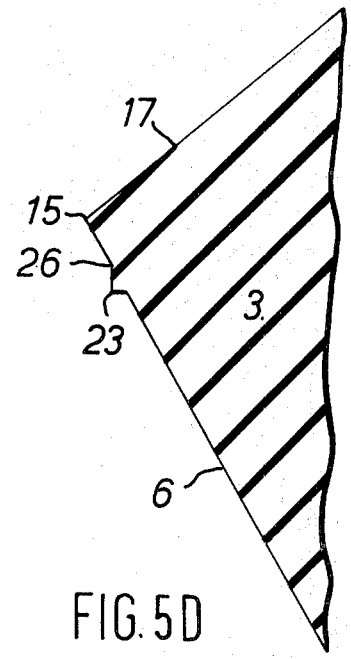

United States Patent [19]
Broad

[11] 3,834,717
[45] Sept. 10, 1974

[54] SHAFT SEALS
[75] Inventor: Frank Alfred Broad, Newcastle upon Tyne, England
[73] Assignee: George Angus & Company Limited, Newcastle upon Tyne, England
[22] Filed: Oct. 20, 1972
[21] Appl. No.: 299,389

[30] Foreign Application Priority Data
Nov. 12, 1971  Great Britain .................... 52648/71

[52] U.S. Cl. ................................ 277/134, 277/153
[51] Int. Cl. ............................................ F16j 15/54
[58] Field of Search .................................... 277/134

[56] References Cited
UNITED STATES PATENTS
3,504,918  4/1970  Halliday .............................. 277/134

Primary Examiner—Samuel B. Rothberg
Attorney, Agent, or Firm—Larson, Taylor & Hinds

[57] ABSTRACT

A positive action shaft seal with a moulded sealing edge has an improved configuration of positive action ridges meeting the sealing edge so that the ridge crests merge into the air side face and only ridge flanks meet the sealing edge.

4 Claims, 15 Drawing Figures

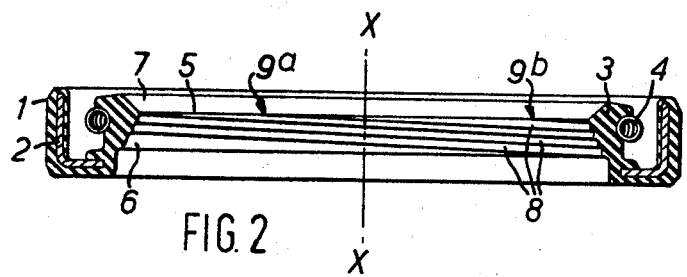
FIG. 2
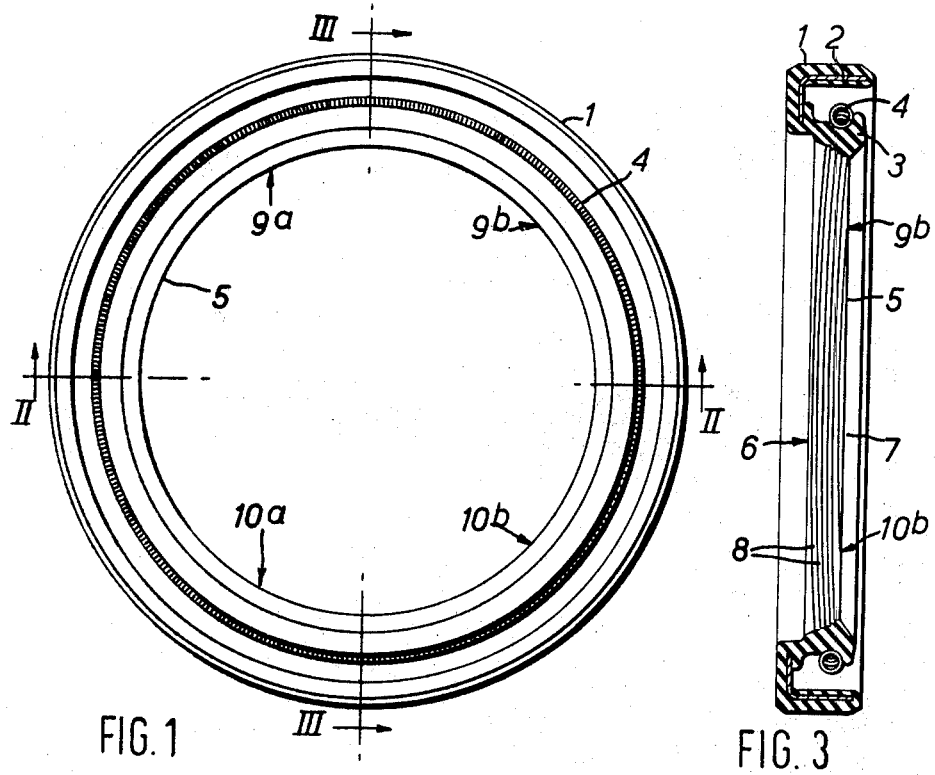
FIG. 1
FIG. 3
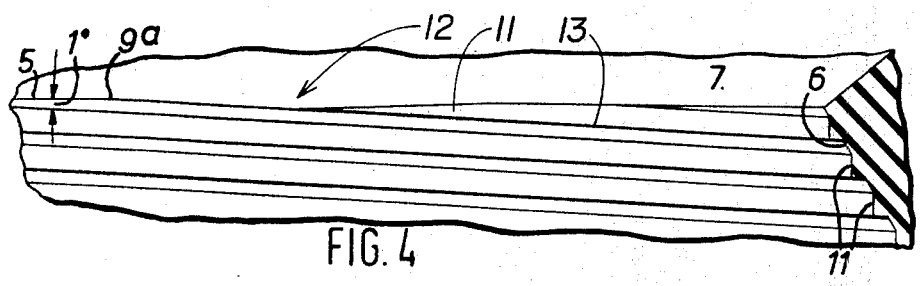
FIG. 4

SHAFT SEALS

This invention relates to shaft seals, also known as oil seals, for sealing against fluid leakage along rotary shafts and which are essentially moulded rubber rings, the term "rubber" including elastomers like rubber and particularly oil-resistant synthetic rubbers.

The invention is concerned with lip-type shaft seals of the kind, known as positive action seals, which each have on the air side, facing away from the sealed fluid, ridges or grooves presenting vane surfaces which converge on the sealing edge and are operative, as a result of relative shaft rotation when the seal is in use, to sweep back to the sealing band fluid leaking past the sealing band.

Examples of positive action lip-type shaft seals are described in U.S. Pat. Nos. 3,504,918, 3,504,920 and 3,504,919.

In the most widely used method of manufacture, lip-type shaft seals are each trimmed, by a knifing operation after moulding, to form a frusto-conical front face, called a trim face, which meets a frusto-conical moulded face on the air side of the sealing head and, by its junction with the moulded face, defines the sealing edge.

In the case of positive action seals with trim faces, the ridges or grooves are moulded on the air side so as to extend across the location of the eventual sealing edge and are cut therewith in the knifing operation.

The usual moulding practice for trim face seals is to make the moulding dies or tools in parts which meet, and thus permit extrusion of rubber as "flash," at the junction of the front and air side surfaces of the sealing head. The flash is cut off when the trim face and sealing edge are knifed.

Some users, particularly in the automobile industry, require lip seals to be manufactured with a moulded sealing edge, as distinct from a knifed sealing edge formed by a trim face, and special provision must be made for this in the design of moulding tools.

For a moulded sealing edge, the moulding tools or die parts must meet at a location, away from the sealing edge, such that the resulting flash can be removed without interfering with the sealing edge. For example, the front of the sealing head can be moulded with an annular shoulder at which the flash forms and which can be trimmed solely for flash removal.

The present invention is based upon the realisation that, given the requirement to manufacture positive action shaft seals with moulded sealing edges, the ends of positive action ridges moulded on the air side can be designed and accurately moulded to provide an improved configuration of their junctions with the sealing edge, this configuration being the critical factor in the efficiency of a positive action seal.

The invention is therefore applied to a shaft seal comprising an elastomeric ring having a sealing lip moulded with a sealing edge and, on the air side, a frusto-conical moulded face with at least one positive-action crested ridge which extends around part of the moulded face so that at least one end of the ridge converges on the sealing edge. According to the invention, the crest of each ridge-end which converges on the sealing edge merges into the moulded face and only a flank of the ridge-end substantially meets the sealing edge.

There is thus provided a well-defined convergence, or "run-out," between each respective ridge-end and the moulded sealing edge, each such run-out providing, for appropriate relative shaft rotation, a capacity for positive action in sweeping back fluid.

Figure 6:
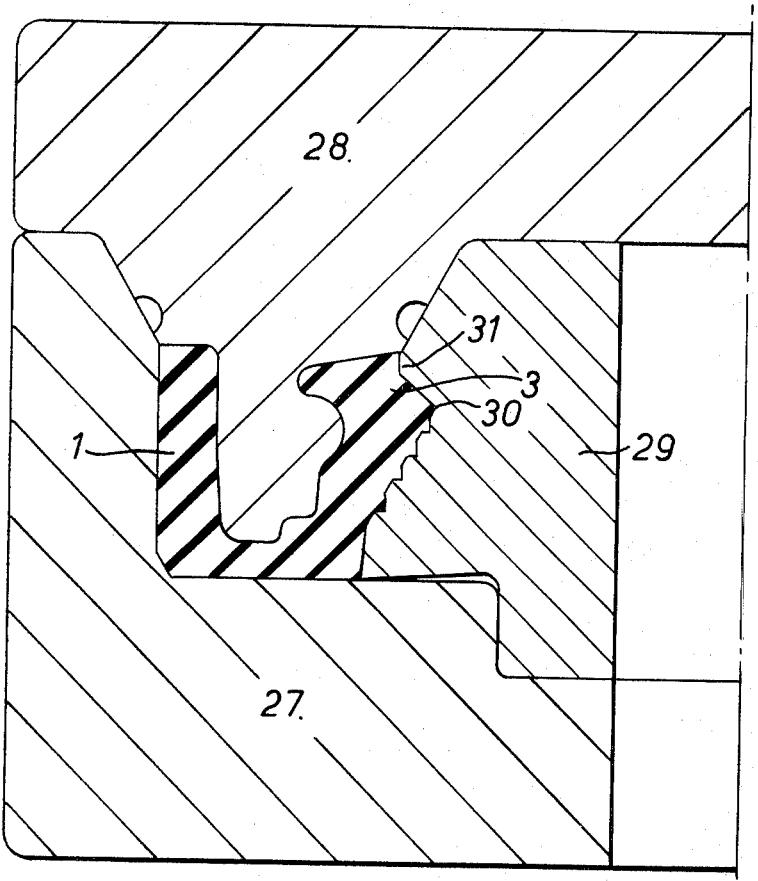
Figure 7:
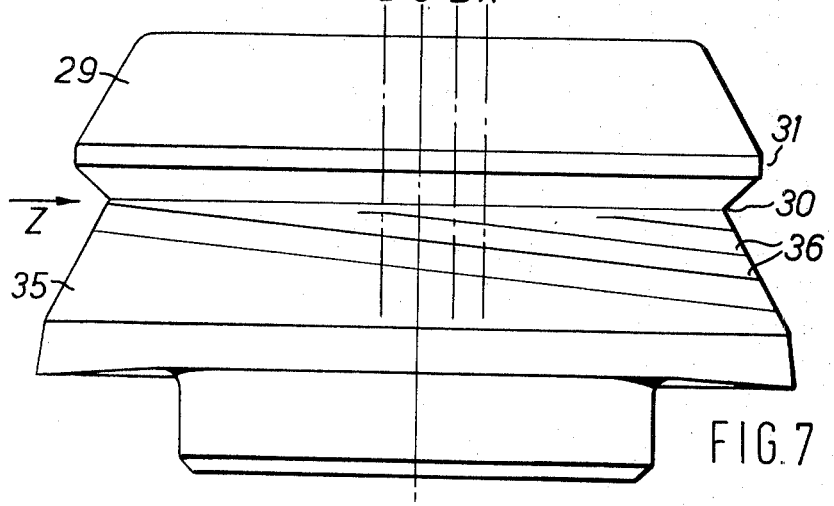
Figure 7A:
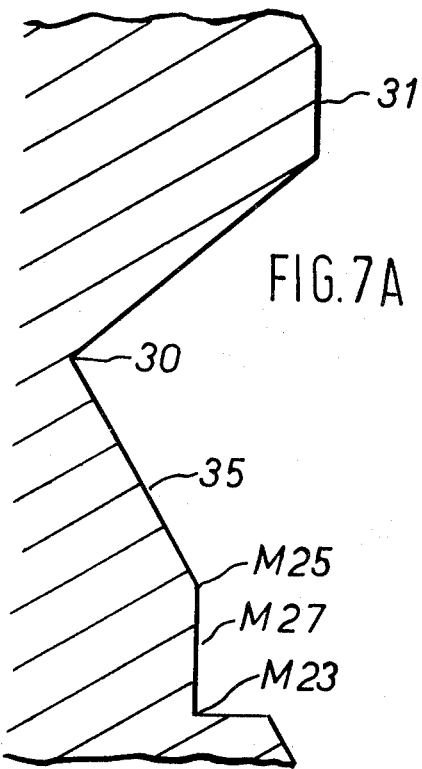
Figure 7B:
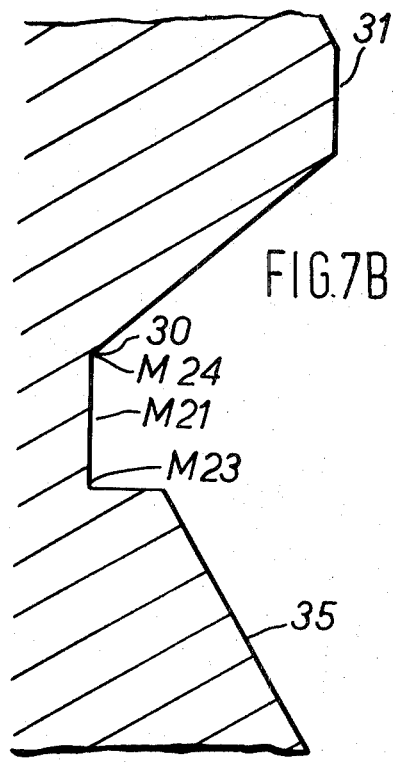
Figure 7C:
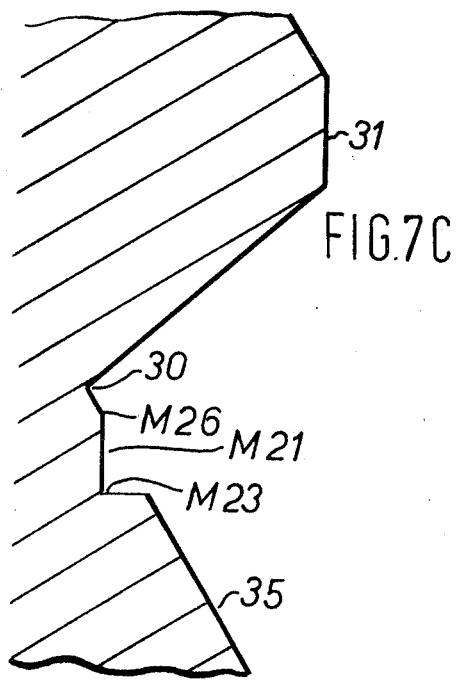
Figure 7D:
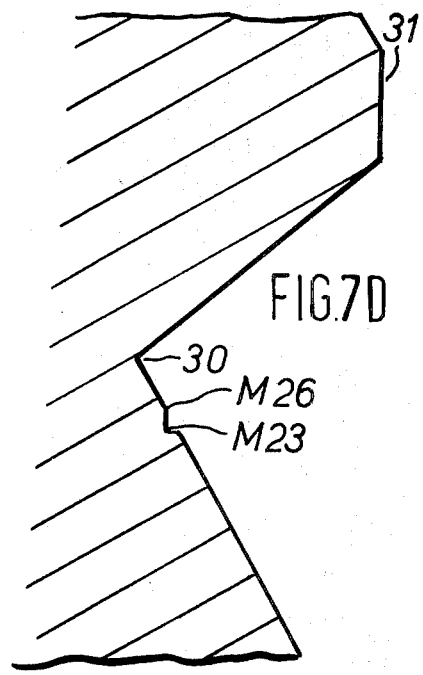

A preferred embodiment of the invention is illustrated, by way of example, on the accompanying drawings, in which:

FIGS. 1 to 4 show a positive action shaft seal in accordance with U.S. Pat. No. 3,504,918 FIG. 1 being a plan view of the front of the seal, FIGS. 2 and 3 diametral sections, on the lines II—II and III—III of FIG. 1 respectively, and FIG. 4 a fragmentary radial section on an enlarged scale and exaggerated to show detail, FIG. 5 is a fragmentary radial section corresponding to FIG. 4 but showing the run-out of a ridge-end at the moulded sealing edge of a seal in accordance with the present invention, FIGS. 5A to 5D are plane radial sections on the lines A to D respectively of FIG. 5 and taken in the direction of the arrow Y on FIG. 5, FIG. 6 is a somewhat diagrammatic radial cross-section through a mould for a seal in accordance with the present invention, FIG. 7 is a side elevation of the die pin of the mould of FIG. 6, and FIGS. 7A to 7D are fragmentary enlarged plane radial sections of the die pin on the lines A to D of FIG. 7 and taken in the direction of the arrow Z on FIG. 7.

The seal shown by FIGS. 1 to 4 is similar to that fully described in U.S. Pat. No. 3,504,918 and need not be dealt with in detail.

However, since the above-mentioned specification was written, there has been adopted, for rotary shaft lip seals, some standard terminology in terms of which, where applicable, the following brief description is given of the seal of FIGS. 1 to 4.

The seal shown is a metal insert seal which is basically a moulded rubber ring having an outer cylindrical wall 1, formed by a rubber cover moulded over the metal insert 2, to serve as a holding portion for mounting in a shaft housing.

A flexible flange or leg 3 of the rubber ring forms the sealing head which seats a garter spring 4 and has a sealing edge 5, a moulded face 6, which is a frusto-conical surface moulded on the outer or air side of the seal, away from the sealed fluid in use, and a trim face 7, which is a frusto-conical surface on the inner or fluid side of the seal.

The positive action features of the seal are slightly oblique circular crested ridges 8 moulded on the face 6 and two of which, in the example shown, intercept the sealing edge 5 so that ends $9^a$ and $10^a$ and $9^b$ and $10^b$ respectively of such two ridges form vane surfaces meeting the sealing edge 5 at a small angle, indicated as 1° in FIG. 4. The ridges 8 have flanks 11 which are substantially cylindrical about the axis X—X of the seal.

The ridge-ends 9 and 10 are formed when the trim face 7 is cut, to form the sealing edge 5, and the convergence or run-out of each cut ridge at the sealing edge 5 produces a very slight protrusion or feather 12 which is shown, much exaggerated, in FIG. 4. The feather is defined by a very slight extension of the trim face 7, beyond the true circular line of the sealing edge 5, joining the respective ridge flank 11 and crest 13.

The existence of such feathers 12 on the trim face seal does not impair the efficiency of the seal, their dimensions being so slight that they are well within the resilient accommodation of the rubber and spring loading, and they are rapidly worn away during the initial bedding-in of the seal when first run on a shaft.

However, with the requirement for positive action seals manufactured with moulded sealing edges comes also the problem of producing effective junctions between the sealing edge and the positive action ridges.

The present invention solves this problem by providing a new formation, at the junction of each respective crested ridge-end with the sealing edge, as illustrated by FIGS. 5 and 5A to 5D which show details of a seal similar to that of FIGS. 1 to 4 except that the sealing edge 15 is moulded as also is an inner frusto-conical face 17 which corresponds to the trim face 7. Corresponding parts which are unchanged have the same reference numerals as in FIGS. 1 to 4.

FIG. 5 shows at one end 19$^a$ of a positive action ridge 18 the crest 23 of the ridge merging into the frusto-conical surface of the moulded face 6 and the flank 21 of the ridge meeting the sealing edge 15 at only a point 24 of the corner of the angle between the two lines 25 and 26 of the junction of the flank 21 with the moulded face 6. This run-out of the ridge-end 19$^a$ is shown in successive sections by FIGS. 5A to 5D.

The formation of the run-out of each of the ends of those ridges which meet the sealing edge is the same except that opposite ends have opposite peripheral directions, e.g. the ends corresponding to 9$^b$ and 10$^b$ in FIG. 3.

A seal as illustrated can be moulded in a die, as shown by FIG. 6, comprising a lower cavity die-part or tool 27, an upper tool 28 and a central die pin 29 which is shown separately in elevation by FIG. 7.

It can be seen from FIG. 6 that the sealing edge 15 is moulded by a recess 30 in the die pin 29 and that the upper tool 28 meets the die pin at a cylindrical land 31 which moulds a shoulder 32 on the seal (FIG. 5) at the rim 33 of which flash can extrude. The flash is trimmed-off, after removal of the moulding from the die, by knifing on the dotted line 34 (FIG. 5).

To form the positive action ridges, the die pin has machined in a frusto-conical face 35, which moulds the seal face 6, a series of oblique circular grooves 36 some of which are intercepted by the waist of the recess 30 so that they each have two ends converging on the waist of the recess 30 in opposite peripheral directions.

The shape of each groove-end is the matrix of the shape of the corresponding ridge-end moulded thereby and this is illustrated by FIGS. 7A to 7D in which, for correlation with FIGS. 5A to 5D, the references M21, M23, M24, M25 and M26, have been used to indicate those parts of the moulding groove which produce the corresponding numbered parts of the ridge.

The grooves 36 can be machined by turning the die pin 29 in a lathe using a forming tool, with a tip profile of the cross-sectional shape of the groove, so that the edge of the tip of the tool which cuts the groove edges M25 and M26 meets, but does not cross, the waist of the recess 30.

The shape of the grooves 36 illustrated, and thus the shape of the positive action ridges, is a right-angled triangular section with the side M21 parallel to the seal axis, X—X in FIG. 2, so that the flank 21 of the ridge is cylindrical about the axis of the seal. This is however only the preferred shape and crested ridges of other cross-sectional shape, for example an isosceles triangle, could be formed by grooves turned using an appropriate tool tip profile.

The invention has been described as applied to a positive action seal with ridges meeting the sealing edge in both peripheral directions, so as to be effective for either direction of relative shaft rotation, but the same configuration of a ridge-end converging on a sealing edge is applicable to uni-directional positive action seals, for example having a moulded face with a multi-start screw thread ending at the sealing edge.

Also the invention is applicable to external seals, to seal against surrounding shaft housings, as well as to internal seals as illustrated.

I claim:

1. In a shaft seal comprising an elastomeric ring having a peripheral sealing lip moulded with a sealing edge and, on the air side, a frusto-conical moulded face with at least one positive-action crested ridge which extends around part of the moulded face so that at least one end of the ridge converges on the sealing edge, the improvement which consists in the crest of each ridge-end which converges on the sealing edge merging into the moulded face before meeting the sealing edge and only a flank of the ridge-end substantially meeting the sealing edge.

2. A shaft seal according to claim 1, in which the said flank of each ridge is substantially cylindrical about the axis of the seal and the ridge-end substantially meets the sealing edge at a point formed by the corner of the angle between two lines of the junction of said flank with the moulded face.

3. A shaft seal according to claim 2, in which at least one said ridge-end converges on the sealing edge in each peripheral direction.

4. A shaft seal according to claim 1, in which at least one said ridge-end converges on the sealing edge in each peripheral direction.

* * * * *